United States Patent
Hiraoka et al.

(10) Patent No.: US 9,948,341 B2
(45) Date of Patent: Apr. 17, 2018

(54) ELECTRONIC DEVICE INCLUDING AN IMPEDENCE MATCHING CIRCUIT

(71) Applicant: KYOCERA Corporation, Kyoto (JP)

(72) Inventors: Yoshiaki Hiraoka, Tokyo (JP); Kenji Higashikatsuragi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/462,976

(22) Filed: Mar. 20, 2017

(65) Prior Publication Data
US 2017/0279473 A1    Sep. 28, 2017

(30) Foreign Application Priority Data

Mar. 24, 2016  (JP) .................................. 2016-060460

(51) Int. Cl.
  *H04B 1/38*    (2015.01)
  *H04B 1/3827*  (2015.01)
  *H01Q 1/27*    (2006.01)

(52) U.S. Cl.
  CPC ............. *H04B 1/385* (2013.01); *H01Q 1/273* (2013.01); *H04B 2001/3866* (2013.01); *H04M 2250/12* (2013.01)

(58) Field of Classification Search
  CPC ............ H04B 1/385; H04B 2001/3866; H01Q 1/273; H04M 2250/12
  See application file for complete search history.

(56) References Cited

U.S. PATENT DOCUMENTS

| 2008/0055537 | A1 | 3/2008 | Asrani et al. |
| 2010/0073103 | A1 | 3/2010 | Spears et al. |
| 2012/0169990 | A1* | 7/2012 | Burnstein ............ A43B 1/0054 351/115 |
| 2012/0220243 | A1* | 8/2012 | Mendolia ............ H04B 1/0458 455/77 |
| 2012/0328134 | A1 | 12/2012 | Lewis |
| 2014/0240474 | A1 | 8/2014 | Kondo |
| 2015/0002374 | A1* | 1/2015 | Erinjippurath ..... G02B 27/0172 345/8 |
| 2016/0204839 | A1* | 7/2016 | Liu ........................ H04B 1/385 345/8 |

FOREIGN PATENT DOCUMENTS

| DE | 19907431 A1 | 8/2000 |
| EP | 2 768 147 A1 | 8/2014 |
| JP | H11-353444 A | 12/1999 |
| JP | 2013-513275 | 4/2013 |
| JP | 2013-090061 A | 5/2013 |

OTHER PUBLICATIONS

The partial European search report (PESR) issued by the European Patent Office dated Aug. 24, 2017, which corresponds to European Patent Application No. 17161841.6-1874 and is related to U.S. Appl. No. 15/462,976.
Extended European Search Report (EESR) dated Nov. 29, 2017, from corresponding EP Appl No. 17161841.6, 9 pp.

* cited by examiner

*Primary Examiner* — Nguyen Vo (74) *Attorney, Agent, or Firm* — Studebaker & Brackett PC (57) ABSTRACT

An electronic device (eyeglasses-type wireless communication device) to be worn by a user includes a wearing section to be worn by the user and an extending section formed in the wearing section and disposed in a direction extending away from the user when the wearing section is worn on the user's head. A first antenna is formed in the extending section.

5 Claims, 5 Drawing Sheets

ELECTRONIC DEVICE INCLUDING AN IMPEDENCE MATCHING CIRCUIT

CROSS REFERENCE TO RELATED APPLICATION

This application claims priority to and the benefit of Japanese Patent Application No. 2016-060460 (filed on Mar. 24, 2016), the entire contents of which are incorporated herein by reference.

TECHNICAL FIELD

This disclosure relates to an electronic device.

BACKGROUND

Currently, straight phones typified by smartphones, along with tablet-type phones and clamshell phones with a folding structure, are widely used as mobile wireless communication devices. Because of their user convenience, it is assumed that devices that can be worn on the user's body will become widespread in the future as mobile wireless communication devices.

One type of device that can be worn on the user's body is mounted on the head. As one embodiment of a head mounted device, eyeglasses-type wireless communication devices are known (see JP 2013-90061 A (PTL 1), JP H11-353444 A (PTL 2), and JP 2013-513275 A (PTL 3)).

CITATION LIST

Patent Literature

PTL 1: JP 2013-90061 A
PTL 2: JP H11-353444 A
PTL 3: JP 2013-513275 A

SUMMARY

Wireless communication devices that are worn on the user's body need to have a Specific Absorption Rate (SAR) equal to or less than a certain threshold. In the eyeglasses-type wireless communication devices in PTL 1 to 3, however, the antenna of the wireless communication device that transmits and receives radio waves is in close contact with the user's head. Therefore, it is easy for the SAR to increase above the threshold.

Therefore, it would be helpful to provide an electronic device that can reduce the SAR.

An electronic device according to one of the embodiments of this disclosure is an electronic device to be worn by a user, the electronic device including: a wearing section to be worn by the user; and an extending section formed in the wearing section and disposed in a direction extending away from the user when the wearing section is worn by the user; such that a first antenna is formed in the extending section.

The electronic device according to one of the embodiments of this disclosure can reduce the SAR.

DETAILED DESCRIPTION

The following describes an electronic device according to one of the embodiments of this disclosure with reference to the drawings. As an example, the following describes the case of using an eyeglasses-type device as an embodiment of a head mounted device.

[Structure of Eyeglasses-type Wireless Communication Device]

Figure 1:
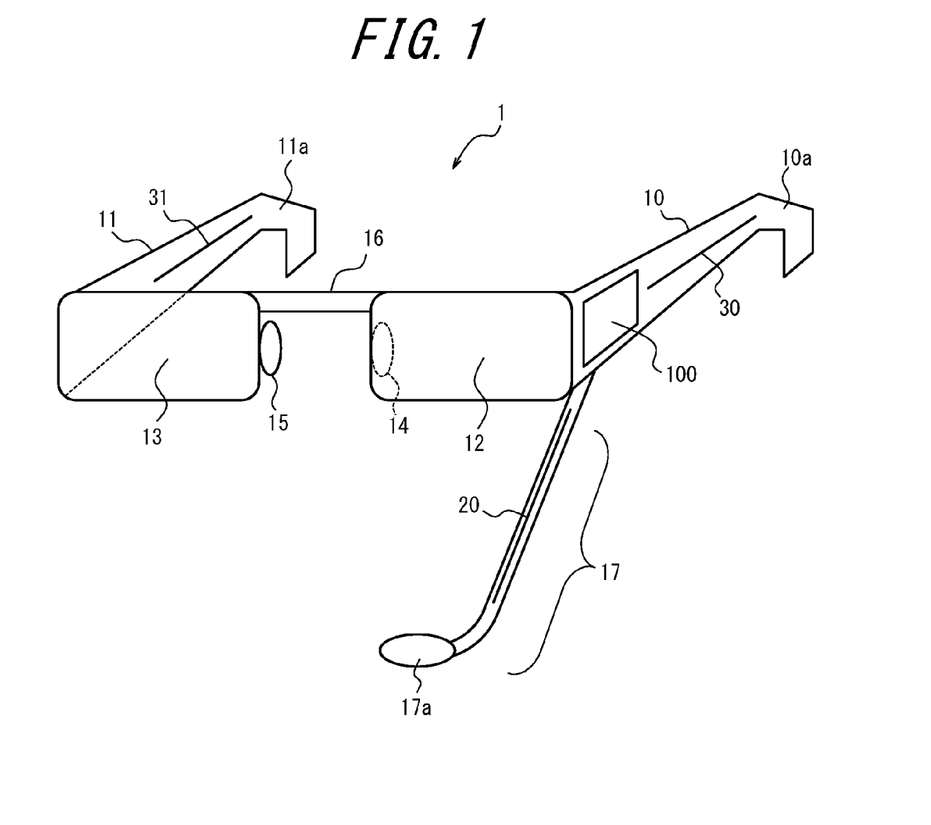
FIG. 1 is a perspective view schematically illustrating an example of the structure of an eyeglasses-type wireless communication device in an embodiment of an electronic device according to this disclosure.

FIG. 1 is a perspective view schematically illustrating an example of the structure of an eyeglasses-type wireless communication device 1 in an embodiment of an electronic device according to this disclosure. The eyeglasses-type wireless communication device 1 includes temples (side frames) 10 and 11, lenses 12 and 13, nose pads 14 and 15, a bridge 16, a boom 17, a main antenna (first antenna) 20, sub-antennas (second antennas) 30 and 31, and a control circuit 100. In FIG. 1, feeders, signal lines, and the like are omitted from the drawing. Among the members illustrated in FIG. 1, the temples (side frames) 10 and 11 and the nose pads 14 and 15 constitute a wearing section to be worn on the user's head.

The temple 10 is positioned on the left side of the user's head when the user is wearing the eyeglasses-type wireless communication device 1 (state of wearing by the user). The temple 11 is positioned on the right side of the user's head when the user is wearing the eyeglasses-type wireless communication device 1.

The temple 10 has an earpiece 10a at the tip thereof. The temple 11 has an earpiece 11a at the tip thereof.

The sub-antenna 30 is formed in the temple 10. The sub-antenna 31 is formed in the temple 11. The earpiece 10a rests on the user's left ear in the state of wearing by the user. The earpiece 11a rests on the user's right ear in the state of wearing by the user.

The lens 12 is connected to the temple 10 at one edge and to the bridge 16 at the other edge. The lens 13 is connected to the temple 11 at one edge and to the bridge 16 at the other edge.

The lens 12 is positioned in front of the user's left eye in the state of wearing by the user. The lens 13 is positioned in front of the user's right eye in the state of wearing by the user.

The nose pad 14 is provided on the bridge 16 side of the lens 12. The nose pad 15 is provided on the bridge 16 side of the lens 13. In the state of wearing by the user, the nose pad 14 touches the left side of the user's nose. In the state of wearing by the user, the nose pad 15 touches the right side of the user's nose.

The bridge 16 maintains the left and right lenses 12 and 13 in a predetermined positional relationship by connecting the lenses 12 and 13.

The boom 17 is a member used when the user talks on the phone with someone else. The boom 17 has a microphone 17a at the tip thereof. The main antenna 20 is disposed in the boom 17. The boom 17 may have a fixed shape or may be configured from a flexible material that can change shape to adapt to the different head shape of each user. The boom 17 is formed on the temple 10 and is formed to extend in a direction away from the user's head when the temple 10 is mounted on the user's head. Therefore, the boom 17 is the extending section.

In the example illustrated in FIG. 1, the boom 17 is disposed in the temple 10 on the left-hand lens 12 side, but the boom 17 may be disposed on the right-hand lens 13 side. The boom 17 is fixed on the temple 10. The boom 17 may, however, be configured to move relative to the temple 10. In this case, the boom 17 can move relative to the temple 10 by means of a hinge or other movement mechanism.

The main antenna 20 is, for example, a monopole antenna that transmits and receives radio waves. The sub-antennas 30 and 31 are, for example, monopole antennas that only receive radio waves. In other words, when transmitting radio waves in the eyeglasses-type wireless communication device 1, only the main antenna 20 is used. On the other hand, when receiving radio waves in the eyeglasses-type wireless communication device 1, the main antenna 20 and the sub-antennas 30 and 31 are used. In FIG. 1, the main antenna 20 and the sub-antennas 30 and 31 are each illustrated as one antenna element but may have antenna elements corresponding in number to the frequency band of radio waves in use.

The control circuit 100 optimizes the reception sensitivity of radio waves received by the main antenna 20. Details on the structure and functions of the control circuit 100 are provided below.

In this way, the eyeglasses-type wireless communication device 1 has the main antenna 20 and the sub-antennas 30 and 31 mounted therein. Therefore, the eyeglasses-type wireless communication device 1 can also support communication methods such as Long Term Evolution (LTE) that require a plurality of antennas.

Also, in the eyeglasses-type wireless communication device 1, the SAR can be reduced by disposing the main antenna 20, for which the radio field intensity of transmitted radio waves is high, in the boom 17 separated from the user's head.

In the eyeglasses-type wireless communication device 1, by disposing the main antenna 20 in the boom 17 separated from the user's head, the main antenna 20 can transmit and receive radio waves with good transmission and reception sensitivity, without radio propagation being blocked by the user's head.

In the LTE system, the isolation between the main antenna 20 and the sub-antennas 30 and 31 can preferably guarantee a level of approximately 10 dB. In the eyeglasses-type wireless communication device 1, the main antenna 20 is disposed in the boom 17, and the sub-antennas 30 and 31 are disposed in the temples 10 and 11. As a result, a distance of 10 cm or more between the main antenna 20 and the sub-antennas 30 and 31 can be guaranteed. In the example in FIG. 1, the distance between antenna tips at the control circuit 100 side of the main antenna 20 and of the sub-antenna 30, which is the location where the main antenna 20 comes closest to the sub-antennas 30 and 31, is 10 cm or greater. When the distance between antennas is 10 cm or greater, the free space loss at each frequency used in the LTE system is as follows. From these values, it is clear that in the eyeglasses-type wireless communication device 1, the isolation between the main antenna 20 and the sub-antennas 30 and 31 can be guaranteed.

| Frequency | Isolation |
|---|---|
| 750 [MHz] | 9.9 [dB] |
| 800 [MHz] | 10.5 [dB] |
| 900 [MHz] | 11.5 [dB] |
| 2.0 [GHz] | 18.5 [dB] |
| 2.6 [GHz] | 20.7 [dB] |

In FIG. 1, the sub-antennas 30 and 31 are disposed on either side of the temples 10 and 11, but a configuration may be adopted in which the sub-antenna 30 or 31 is only disposed in one of the temples 10 or 11. For example, so as to increase the distance from the main antenna 20, the sub-antenna 31 may be disposed only in the temple 11, thereby maintaining better isolation between the main antenna 20 and the sub-antenna 31.

<Optimization of Reception Sensitivity>

Depending on the user of the eyeglasses-type wireless communication device 1, the boom 17 may change shape, and the distance between the boom 17 and the user's body may change. This is because, for example, the shape of the head is different for each user, and because the user may change the position of the microphone 17a during use. When the shape of the boom 17 changes or the distance between the boom 17 and the user's body changes, the reception sensitivity of radio waves received by the main antenna 20 may end up changing. For example, one reason is that when the boom 17 and the user's body are close, radio propagation is blocked by the user's body. In the eyeglasses-type wireless communication device 1 according to one of the embodiments of this disclosure, the reception sensitivity of the main antenna 20 can be optimized in this case as well. The following describes this function.

Figure 2:
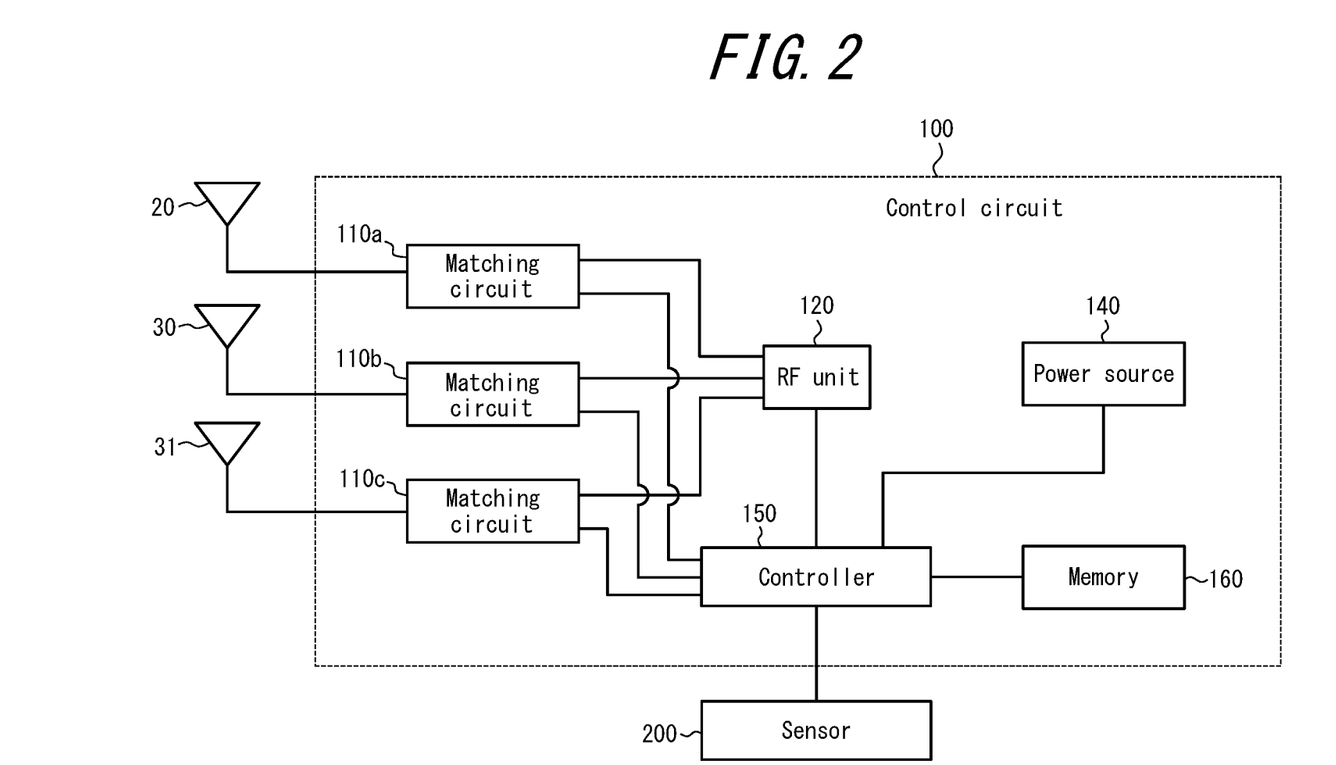
FIG. 2 is a functional block diagram illustrating an example of the circuit structure of the eyeglasses-type wireless communication device illustrated in FIG. 1.

First, the following describes the circuit structure of one of the embodiments of an electronic device according to this disclosure. FIG. 2 is a functional block diagram illustrating an example of the circuit structure of the eyeglasses-type wireless communication device 1 illustrated in FIG. 1. The eyeglasses-type wireless communication device 1 is provided with the main antenna 20, the sub-antennas 30 and 31, the control circuit 100, and a sensor 200.

The main antenna 20 and the sub-antennas 30 and 31 supply the received radio waves to the control circuit 100 as a reception signal. Radio waves are transmitted from the main antenna 20.

The control circuit 100 includes matching circuits 110a, 110b, and 110c, a Radio Frequency (RF) unit 120, a power source 140, a controller 150, and a memory 160.

The matching circuit 110a adjusts the impedance within the matching circuit 110a based on a control signal from the controller 150 so as to match the impedance of the main antenna 20 to the impedance of the circuitry forming the control circuit 100. Upon matching the impedance of the main antenna 20 to the impedance of the circuitry forming the control circuit 100, the reflection in the control circuit 100 of the received signal from the main antenna 20 is reduced, and the intensity of the received signal processed by the controller 150 increases. In other words, a state in which the impedance in the matching circuit 110a is adjusted so that the impedance of the main antenna 20 and the impedance of the circuitry forming the control circuit 100 match is a state in which the reception sensitivity of the radio waves received by the main antenna 20 is optimized. The impedance of the matching circuit 110a is matched by the controller 150 by changing the value of the impedance of the capacitors and inductors forming the matching circuit 110*a* or changing the connection relationship therebetween.

The matching circuit 110*b* adjusts the impedance within the matching circuit 110*b* based on a control signal from the controller 150 so as to match the impedance of the sub-antenna 30 to the impedance of the circuitry forming the control circuit 100. Upon matching the impedance of the sub-antenna 30 to the impedance of the circuitry forming the control circuit 100, the reflection in the control circuit 100 of the received signal from the sub-antenna 30 is reduced, and the intensity of the received signal processed by the controller 150 increases. In other words, a state in which the impedance in the matching circuit 110*b* is adjusted so that the impedance of the sub-antenna 30 and the impedance of the circuitry forming the control circuit 100 match is a state in which the reception sensitivity of the radio waves received by the sub-antenna 30 is optimized. The impedance of the matching circuit 110*b* is matched by the controller 150 by changing the value of the impedance of the capacitors and inductors forming the matching circuit 110*b* or changing the connection relationship therebetween.

The matching circuit 110*c* adjusts the impedance within the matching circuit 110*c* based on a control signal from the controller 150 so as to match the impedance of the sub-antenna 31 to the impedance of the circuitry forming the control circuit 100. Upon matching the impedance of the sub-antenna 31 to the impedance of the circuitry forming the control circuit 100, the reflection in the control circuit 100 of the received signal from the sub-antenna 31 is reduced, and the intensity of the received signal processed by the controller 150 increases. In other words, a state in which the impedance in the matching circuit 110*c* is adjusted so that the impedance of the sub-antenna 31 and the impedance of the circuitry forming the control circuit 100 match is a state in which the reception sensitivity of the radio waves received by the sub-antenna 31 is optimized. The impedance of the matching circuit 110*c* is matched by the controller 150 by changing the value of the impedance of the capacitors and inductors forming the matching circuit 110*c* or changing the connection relationship therebetween.

Figure 3:
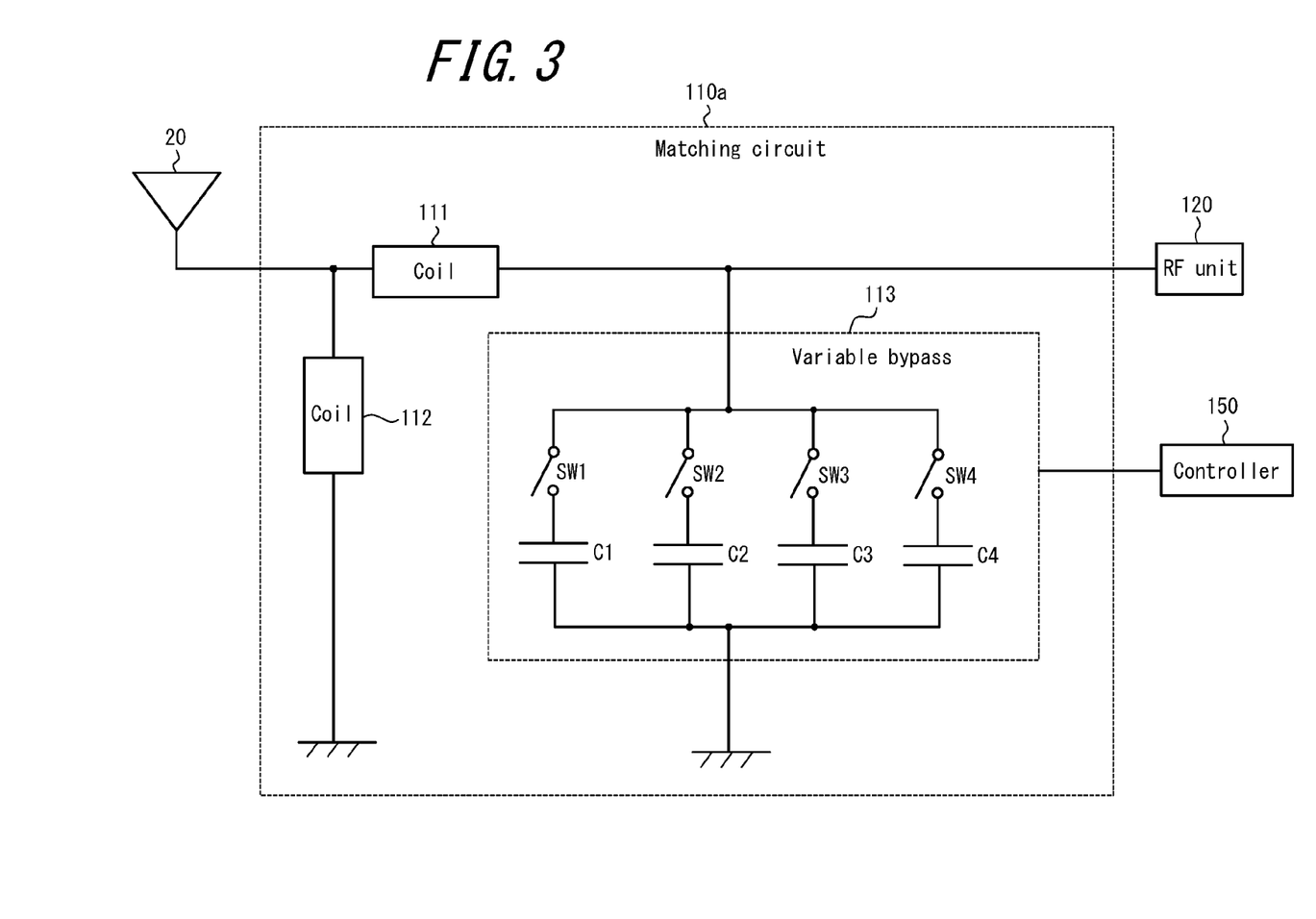
FIG. 3 is a functional block diagram illustrating an example of the circuit structure of a matching circuit.

FIG. 3 illustrates an example of the circuit structure of the matching circuit 110*a*. Since the matching circuits 110*b* and 110*c* illustrated in FIG. 2 have a similar circuit structure to the one illustrated in FIG. 3, a description thereof is omitted. The matching circuit 110*a* has coils 111 and 112 and a variable bypass 113. The variable bypass 113 has switches SW1, SW2, SW3, and SW4 (switches SW1-SW4) and capacitors C1, C2, C3, and C4 (capacitors C1-C4).

The capacitors C1-C4 may each have a different capacitance. By turning the switches SW1-SW4 on/off by control signals from the controller 150 to change the combination of capacitors C1-C4 connected to the input side of the RF unit 120, the impedance in the matching circuit 110*a* can be adjusted.

Hereinafter, the combinations of patterns of changes to the impedance and changes to the connection relationship of the capacitors and inductors in order to change the impedance in the matching circuit 110*a* that is adjusted by a control signal from the controller 150 are referred to as variable patterns. In the example illustrated in FIG. 3, the impedance within the matching circuit 110*a* is made variable by the connection relationship of the capacitors. In this embodiment, however, instead of the connection relationship of the capacitors or along with the connection relationship of the capacitors, the impedance within the matching circuit 110*a* may be made variable by an appropriate combination of a change in the capacitance of the capacitors, a change in the connection relationship of the inductors, a change in the impedance of the inductors, or the like.

In the above way, the matching circuit 110*a* is connected to the main antenna 20 and is settable to a plurality of impedances. Furthermore, the matching circuit 110*a* is settable to a plurality of impedances through control by the controller 150. For example, in the matching circuit 110*a* illustrated in FIG. 3, by turning the switches SW1-SW4 on/off by control signals from the controller 150 to change the combination of capacitors C1-C4 connected to the input side of the RF unit 120, 16 types of impedance patterns can be set. Some of these 16 impedance patterns may result in the same impedance value, or all of the resulting impedance values may be different.

The RF unit 120 changes the received signal supplied by the matching circuits 110*a*, 110*b*, and 110*c* into a band that can be processed digitally. The RF unit 120 outputs the received signal after modulation to the controller 150. At this time, the RF unit 120 notifies the controller 150 of the level of the electric field of the received signal. The RF unit 120 also converts the signal output from the controller 150 (the transmission signal) into the RF band. The RF unit 120 outputs the converted transmission signal to the matching circuits 110*a*, 110*b*, and 110*c*.

The power source 140 may, for example, be configured using a rechargeable secondary battery. The power source 140 supplies power to the RF unit 120, the controller 150, the memory 160, and the like. In the example illustrated in FIG. 2, in order to simplify the drawings, the power source 140 is only connected to the controller 150, but the power source 140 actually provides power to each element in the eyeglasses-type wireless communication device 1.

The controller 150 controls and manages the eyeglasses-type wireless communication device 1 overall and may, for example, be configured using a processor. The controller 150 implements a variety of functions by reading and executing programs stored in the memory 160. The controller 150 may also include a Digital Signal Processor (DSP).

The controller 150 demodulates the received signal acquired from the RF unit 120. The controller 150 also measures the reception sensitivity of the radio waves from the level of the electric field of the received signal acquired from the RF unit 120. The controller 150 then changes the impedance within the matching circuits 110*a*-110*c* by outputting control signals to the matching circuits 110*a*-110*c* and optimizes the reception sensitivity of the radio waves received by the main antenna 20 and the like. Details on the functions of the controller 150 are provided below.

The memory 160 stores information necessary for processing by the controller 150 and a program with a description of processing to implement the functions of the controller 150. The memory 160 stores the reception sensitivity of the radio waves measured by the controller 150.

The sensor 200 detects that the user is wearing the eyeglasses-type wireless communication device 1. Upon detecting that the user is wearing the eyeglasses-type wireless communication device 1, the sensor 200 outputs a detection signal to the controller 150. The sensor 200 is, for example, disposed in the nose pads 14 and 15 and/or the earpieces 10*a* and 11*a* illustrated in FIG. 1. When the user wears the eyeglasses-type wireless communication device 1, the sensor 200 disposed in the nose pads 14 and 15 and/or the earpieces 10*a* and 11*a* detects contact with the user, thereby detecting that the user is wearing the eyeglasses-type wireless communication device 1. In this embodiment, a capacitance sensor that detects wearing by the user through a change in the capacitance is used as the sensor 200. Instead of a capacitance sensor, another sensor such as an infrared sensor may be used as the sensor 200. When the sensor 200 does not detect whether the user is wearing the eyeglasses-type wireless communication device 1, the sensor 200 may be omitted from the eyeglasses-type wireless communication device 1.

Details on the functions of the controller 150 are now provided. Hereinafter, it is assumed that the user is wearing the eyeglasses-type wireless communication device 1. Also, among the matching circuits 110a-110c controlled by the controller 150, the following describes an example of the controller 150 controlling the matching circuit 110a.

First, the controller 150 sets the variable pattern of the matching circuit 110a to a standard pattern. The standard pattern is the variable pattern yielding the best reception sensitivity of radio waves received by the main antenna 20 when the user is not wearing the eyeglasses-type wireless communication device 1. During this standard pattern, the impedance of the matching circuit 110a is set to a predetermined value.

Next, while changing the variable pattern of the matching circuit 110a by a control signal, the controller 150 measures the reception sensitivity of the radio waves received by the main antenna 20 for all of the variable patterns in the matching circuit 110a. At this time, the controller 150 stores the measured reception sensitivity in the memory 160 in association with the variable pattern.

Subsequently, the controller 150 reads the reception sensitivity of the measured radio waves from the memory 160 and selects the best reception sensitivity A from among the measured reception sensitivities. Additionally, the controller 150 outputs a control signal to the matching circuit 110a to set the variable pattern of the matching circuit 110a to the variable pattern corresponding to the reception sensitivity A. In this way, for example even if the shape of the boom 17 changes or the distance between the boom 17 and the user's body changes in accordance with the shape of the head of the user that is using the eyeglasses-type wireless communication device 1, the reception sensitivity of the radio waves can be optimized.

After a first predetermined time elapses, the controller 150 measures the reception sensitivity B for the current variable pattern of the matching circuit 110a. The controller 150 then determines whether the difference between the reception sensitivity A and the reception sensitivity B is a predetermined threshold or greater.

When the difference between the reception sensitivity A and the reception sensitivity B is a predetermined threshold or greater, the controller 150 again performs processing such as the above-described processing to measure the reception sensitivity of the radio waves received by the main antenna 20 for all of the variable patterns in the matching circuit 110a. The controller 150 then sets the variable pattern of the matching circuit 110a to the variable pattern corresponding to the best reception sensitivity A that was selected again. In this way, for example even if the shape of the boom 17 changes or the distance between the boom 17 and the user's body changes as a result of the user readjusting the position of the microphone 17a during use, the reception sensitivity of the radio waves can be optimized.

On the other hand, when determining that the difference between the reception sensitivity A and the reception sensitivity B is not a predetermined threshold or greater, the controller 150 again performs the above-described processing (such as processing in which, after a first predetermined time elapses, the controller 150 measures the reception sensitivity B for the current variable pattern of the matching circuit 110a).

With reference to the drawings, the following describes operations of the eyeglasses-type wireless communication device 1 according to one of the disclosed embodiments in further detail. Among the matching circuits 110a-110c controlled by the controller 150, the following describes an example of the controller 150 controlling the matching circuit 110a.

Figure 4:
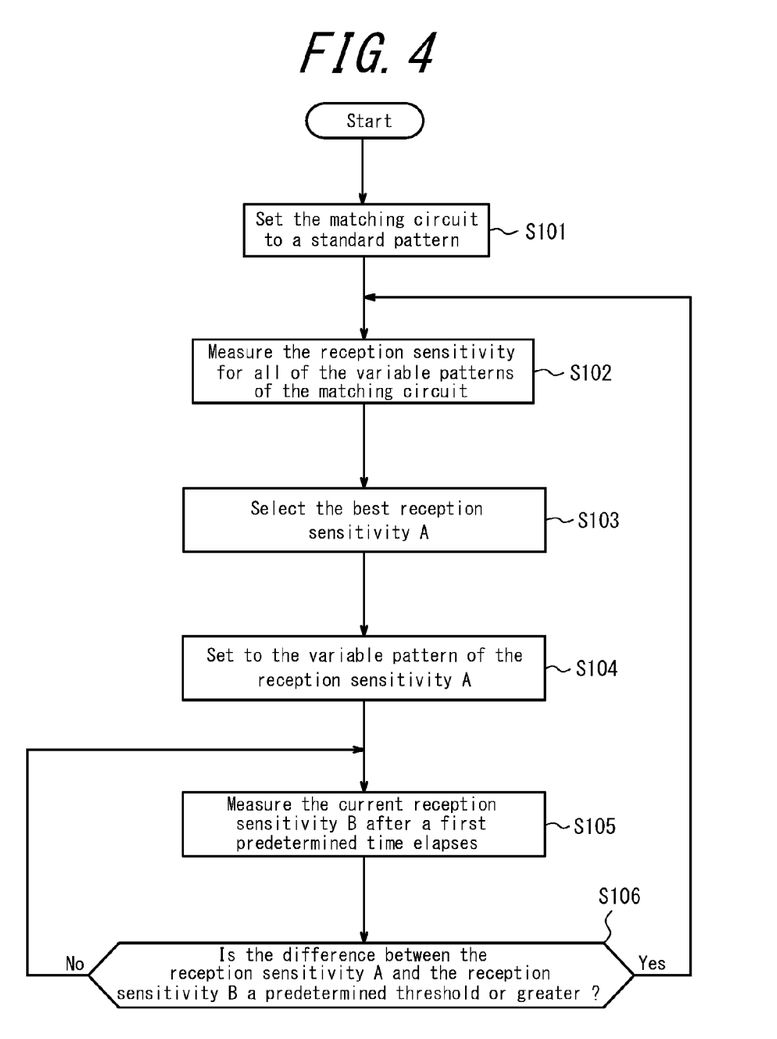
FIG. 4 is a flowchart illustrating an example of circuit operations when optimizing the reception sensitivity of the main antenna.

FIG. 4 is a flowchart illustrating an example of circuit operations when optimizing the reception sensitivity of radio waves by the main antenna 20. Hereinafter, it is assumed that the user is wearing the eyeglasses-type wireless communication device 1.

First, the controller 150 sets the variable pattern of the matching circuit 110a to a standard pattern (step S101). The standard pattern is the variable pattern when the reception sensitivity of radio waves received by the main antenna 20 is the best while the user is not wearing the eyeglasses-type wireless communication device 1.

Next, while changing the variable pattern of the matching circuit 110a by a control signal, the controller 150 measures the reception sensitivity of the radio waves received by the main antenna 20 for all of the variable patterns in the matching circuit 110a (step S102). At this time, the controller 150 stores the measured reception sensitivity in the memory 160 in association with the variable pattern. "All of the variable patterns in the matching circuit 110a" refers to all of the patterns of combinations of capacitors and inductors for which the impedance changes in the matching circuit 110a. In this embodiment, the reception sensitivity is measured for all of the variable patterns in the matching circuit 110a, but the reception sensitivity may be measured for a combination of a portion of the variable patterns with impedance in a predetermined range instead of for all of the variable patterns.

Subsequently, the controller 150 reads the reception sensitivity of the radio waves measured during the processing in step S102 from the memory 160 and selects the best reception sensitivity A from among the measured reception sensitivities (step S103). Additionally, the controller 150 outputs a control signal to the matching circuit 110a to set the variable pattern of the matching circuit 110a to the variable pattern corresponding to the reception sensitivity A (step S104).

By executing the processing in steps S103 and S104 in this way, for example even if the shape of the boom 17 changes or the distance between the boom 17 and the user's body changes in accordance with the shape of the head of the user that is using the eyeglasses-type wireless communication device 1, the reception sensitivity of the radio waves can be optimized.

Next, after a first predetermined time elapses from when the controller 150 sets the variable pattern of the matching circuit 110a to the variable pattern corresponding to the reception sensitivity A, the controller 150 measures the reception sensitivity B for the current variable pattern of the matching circuit 110a (step S105). The controller 150 then determines whether the difference between the reception sensitivity A and the reception sensitivity B is a predetermined threshold or greater (step S106).

When determining that the difference between the reception sensitivity A and the reception sensitivity B is at least a predetermined threshold (step S106: Yes), the controller 150 repeats the processing from step S102. When determining that the difference between the reception sensitivity A and the reception sensitivity B is not at least a predetermined threshold (step S106: No), the controller 150 repeats the processing from step S105.

By executing the processing in steps S105 and S106 in this way, for example even if the shape of the boom 17 changes or the distance between the boom 17 and the user's body changes as a result of the user readjusting the position of the microphone 17a during use after the processing in step S104, the reception sensitivity of the radio waves can be optimized.

In this way, the eyeglasses-type wireless communication device 1 of this embodiment includes a boom 17 used when the user talks on the phone with someone else, and the boom 17 includes the main antenna 20. As a result, the main antenna 20 with a strong radio field intensity is disposed in the boom 17 separate from the user's head, thereby allowing a reduction in the SAR. By disposing the main antenna 20 in the boom 17 separated from the user's head, the main antenna 20 can transmit and receive radio waves without radio propagation being blocked by the user's head.

In the eyeglasses-type wireless communication device 1 of this embodiment, the controller 150 measures the reception sensitivity of the main antenna 20 and sets the matching circuit 110a to the variable pattern corresponding to the best reception sensitivity A, thereby optimizing the reception sensitivity of the main antenna 20. In this way, for example even if the shape of the boom 17 changes or the distance between the boom 17 and the user's body changes in accordance with the shape of the head of the user that is using the eyeglasses-type wireless communication device 1, the reception sensitivity of the radio waves can be optimized.

In the eyeglasses-type wireless communication device 1 of this embodiment, after a first predetermined time elapses from when the controller 150 sets the variable pattern of the matching circuit 110a to the variable pattern corresponding to the reception sensitivity A, the controller 150 measures the current reception sensitivity B of the main antenna 20. Additionally, when the difference between the best reception sensitivity A measured the previous time and the currently measured reception sensitivity B is a predetermined threshold or greater, the controller 150 again measures the reception sensitivity of the main antenna 20 for all of the variable patterns in the matching circuit 110a. The controller 150 then selects the best reception sensitivity A again and sets the matching circuit 110a to the variable pattern corresponding to the reception sensitivity A. In this way, for example even if the shape of the boom 17 changes or the distance between the boom 17 and the user's body changes as a result of the user readjusting the position of the microphone 17a during use, the reception sensitivity of the radio waves can be optimized.

<Modification>

The following describes a modification to the eyeglasses-type wireless communication device 1 of an embodiment of an electronic device according to this disclosure. In the following explanation, only the differences in the structure, functions, and operations as compared to the above-described eyeglasses-type wireless communication device 1 of an embodiment of an electronic device according to this disclosure are described.

This modification aims to reduce the power consumed as a result of the controller 150 determining, with the sensor 200, whether the user is wearing the eyeglasses-type wireless communication device 1.

When the user is not wearing the eyeglasses-type wireless communication device 1 (when the device is not being worn on the body), it is thought that the shape of the boom 17 will not be changed by the user. Therefore, in this case, this modification reduces the power consumption of the eyeglasses-type wireless communication device 1 by not executing processing such as measurement of reception sensitivity.

First, the controller 150 determines whether the eyeglasses-type wireless communication device 1 is being worn on the user's body. For example, when acquiring a detection signal output from the sensor 200 when the user is wearing the eyeglasses-type wireless communication device 1, the controller 150 determines that the eyeglasses-type wireless communication device 1 is being worn on the user's body.

When determining that the eyeglasses-type wireless communication device 1 is not being worn on the user's body, the controller 150 makes a setting for the standard pattern to be used in the matching circuits 110a-110c during a second predetermined time starting from this determination.

As a result, during a second predetermined time starting from a determination, this modification can reduce the power for measurement of the reception sensitivity by using the standard pattern without, for example, performing an operation such as the one in step S203 of FIG. 5, described below, to measure the sensitivity. Accordingly, this modification can reduce the power consumption of the eyeglasses-type wireless communication device 1.

After the second predetermined time elapses from the determination of whether the user is wearing the eyeglasses-type wireless communication device 1, the controller 150 again executes processing to determine whether the eyeglasses-type wireless communication device 1 is being worn on the user's body.

When determining that the eyeglasses-type wireless communication device 1 is being worn on the user's body, the controller 150 measures the reception sensitivity of the radio waves received by the main antenna 20 and the sub-antennas 30 and 31 for all of the variable patterns in the matching circuits 110a-110c, as in the processing in step S102 in the explanation of the above embodiment.

The controller 150 then selects the best reception sensitivity A from the measured reception sensitivities and sets the variable pattern corresponding to the reception sensitivity A to be used in the matching circuits 110a-110c during a third predetermined time starting from this selection. Subsequently, the controller 150 again executes the above-described processing of step S201 to determine whether the eyeglasses-type wireless communication device 1 is being worn on the user's body.

Figure 5:
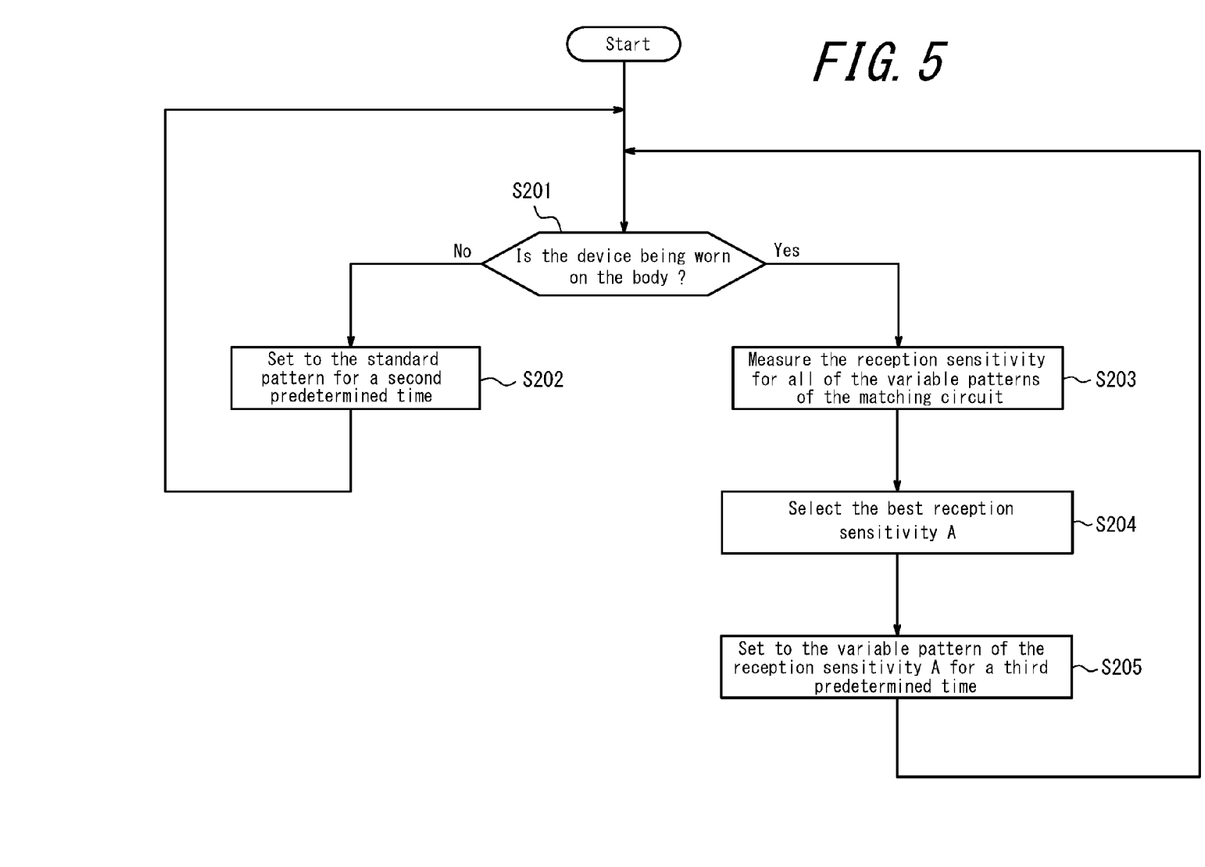
FIG. 5 is a flowchart illustrating an example of circuit operations when the device is being worn and not being worn.

With reference to FIG. 5, the processing of the above modification is now described. FIG. 5 is a flowchart of operations by the modification to the eyeglasses-type wireless communication device 1 in an embodiment of an electronic device according to this disclosure. Among the matching circuits 110a-110c controlled by the controller 150, the following describes an example of the controller 150 controlling the matching circuit 110a.

First, the controller 150 determines whether the eyeglasses-type wireless communication device 1 is being worn on the user's body (step S201). For example, when acquiring a detection signal output from the sensor 200 when the user is wearing the eyeglasses-type wireless communication device 1, the controller 150 determines that the eyeglasses-type wireless communication device 1 is being worn on the user's body.

When the controller 150 determines that the eyeglasses-type wireless communication device 1 is not being worn on the user's body (step S201: No), processing proceeds to step S202. Conversely, when the controller 150 determines that the eyeglasses-type wireless communication device 1 is being worn on the user's body (step S201: Yes), processing proceeds to step S203.

In the processing of step S202, the controller 150 makes a setting for the standard pattern to be used in the matching circuit 110a during the second predetermined time starting from the determination that the eyeglasses-type wireless communication device 1 is not being worn on the user's body. Subsequently, the controller 150 repeats the processing from step S201.

In this way, by executing the processing in steps S201 and S202 in this modification, operations such as measurement of the reception sensitivity are not performed while the user is not wearing the eyeglasses-type wireless communication device 1, and the variable pattern in the matching circuit 110a is set to the standard pattern during the second predetermined time.

As a result, this modification can reduce the power consumption in the eyeglasses-type wireless communication device 1, since for example operations such as measurement of the reception sensitivity indicated in step S203 can be avoided when the eyeglasses-type wireless communication device 1 is not being worn by the user.

The processing in steps S203 and S204 is the same as the processing in steps S102 and S103 illustrated in FIG. 4. Hence, a description thereof is omitted.

In the processing of step S205, the controller 150 sets the variable pattern corresponding to the reception sensitivity A to be used in the matching circuit 110a during the third predetermined time. Subsequently, the controller 150 repeats the processing from step S201.

In this way, the same effects as the above embodiment are achieved with this modification, and the controller 150 sets the variable pattern of the matching circuit 110a to the standard pattern for the second predetermined time when determining, with the sensor 200, that the eyeglasses-type wireless communication device 1 is not being worn by the user. As a result, this modification can reduce the power consumption in the eyeglasses-type wireless communication device 1, since for example operations such as measurement of the reception sensitivity can be avoided when the eyeglasses-type wireless communication device 1 is not being worn by the user.

The controller 150 has been described as adjusting the variable pattern of the matching circuit 110a to the optimal pattern, but in this disclosure, the variable pattern of the matching circuit 110b and of the matching circuit 110c may be adjusted to the optimal pattern as in the above embodiment so as to match the impedance of the sub-antennas 30 and 31.

The eyeglasses-type wireless communication device 1 has been described as an example embodiment of an electronic device according to this disclosure, but this disclosure is not limited to this example. An electronic device according to this disclosure may, for example, have the shape of headphones including a boom. In this case, the sub-antenna can be disposed in the arm or headband of the headphones as the side frame. Also, an electronic device according to this disclosure may, for example, have the shape of a helmet including a boom. In this case, the sub-antenna can be disposed in the body of the helmet as the side frame.

Although exemplary embodiments have been described with reference to the accompanying drawings, it is to be noted that various changes and modifications will be apparent to those skilled in the art based on this disclosure. Therefore, such changes and modifications are to be understood as included within the scope of this disclosure. For example, the functions and the like included in the various components and steps may be reordered in any logically consistent way. Furthermore, components or steps may be combined into one or divided. Furthermore, while this disclosure has been described focusing on apparatuses, this disclosure may also be embodied as a method or program executed by a processor provided in an apparatus, or as a non-transitory computer-readable recording medium on which a program is recorded. Such embodiments are also to be understood as included in the scope of this disclosure.

The invention claimed is:

1. An electronic device to be worn by a user, the electronic device comprising:
   a wearing section to be worn by the user;
   an extending section formed in the wearing section and disposed in a direction extending away from the user when the wearing section is worn by the user, wherein a first antenna is formed in the extending section;
   a matching circuit connected to the first antenna and settable to a plurality of impedances; and
   a controller configured to control the matching circuit; wherein:
   the controller sets the impedance of the matching circuit based on measurement results of reception sensitivity of the first antenna obtained by changing the impedance of the matching circuit a plurality of times;
   after a first predetermined time elapses from when the controller sets the impedance of the matching circuit, the controller measures a current reception sensitivity of the first antenna; and
   when a difference between a measurement result of the current reception sensitivity and a measurement result of a previous reception sensitivity of the first antenna is a predetermined threshold or greater, the controller sets the impedance of the matching circuit based on measurement results of reception sensitivity of the first antenna obtained by changing the impedance of the matching circuit a plurality of times.

2. The electronic device of claim 1, wherein the wearing section comprises a second antenna.

3. An electronic device to be worn by a user, the electronic device comprising:
   a wearing section to be worn by the user;
   an extending section formed in the wearing section and disposed in a direction extending away from the user when the wearing section is worn by the user, wherein a first antenna is formed in the extending section;
   a matching circuit connected to the first antenna and settable to a plurality of impedances;
   a sensor configured to detect that the electronic device is being worn by the user; and
   a controller configured to control the matching circuit; wherein the controller:
   sets the impedance of the matching circuit based on measurement results of reception sensitivity of the first antenna obtained by changing the impedance of the matching circuit a plurality of times;
   sets the impedance of the matching circuit to a predetermined value when determining that the electronic device is not being worn by the user based on a detection result of the sensor; and performs detection with the sensor after a second predetermined time elapses from when the controller sets the impedance of the matching circuit to the predetermined value.

4. The electronic device of claim 3, wherein when determining that the electronic device is being worn by the user based on the detection result of the sensor, the controller sets the impedance of the matching circuit based on measurement results of reception sensitivity of the first antenna obtained by changing the impedance of the matching circuit a plurality of times.

5. The electronic device of claim 3, wherein the wearing section comprises a second antenna.

* * * * *